(12) United States Patent
Somasundaram et al.

(10) Patent No.: US 8,310,946 B2
(45) Date of Patent: Nov. 13, 2012

(54) CELL SELECTION AND RESELECTION FOR CLOSED SUBSCRIBER GROUP CELLS

(75) Inventors: Shankar Somasundaram, Deer Park, NY (US); Peter S. Wang, East Setauket, NY (US); Ulises Olvera-Hernandez, Kirkland (CA); Rajat P. Mukherjee, Stanford, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 599 days.

(21) Appl. No.: 12/410,075

(22) Filed: Mar. 24, 2009

(65) Prior Publication Data
US 2009/0238117 A1 Sep. 24, 2009

Related U.S. Application Data

(60) Provisional application No. 61/038,833, filed on Mar. 24, 2008, provisional application No. 61/082,013, filed on Jul. 18, 2008.

(51) Int. Cl.
*H04W 4/00* (2009.01)
(52) U.S. Cl. ........... 370/252; 320/328; 455/435.1; 455/436; 455/446; 455/525
(58) Field of Classification Search .......... None
See application file for complete search history.

(56) References Cited

U.S. PATENT DOCUMENTS

| | | | | |
|---|---|---|---|---|
| 5,353,332 A | * | 10/1994 | Raith et al. | 455/455 |
| 6,546,251 B1 | * | 4/2003 | Dalsgaard et al. | 455/437 |
| 2005/0090278 A1 | * | 4/2005 | Jeong et al. | 455/525 |
| 2006/0111110 A1 | * | 5/2006 | Schwarz et al. | 455/439 |
| 2007/0111741 A1 | * | 5/2007 | Roberts | 455/515 |
| 2007/0223599 A1 | * | 9/2007 | Sheng et al. | 375/259 |
| 2008/0267153 A1 | | 10/2008 | Mukherjee et al. | 370/338 |

OTHER PUBLICATIONS

Third Generation Partnership Project, "Technical Specification Group Radio Access Network; Evolved Universal Terrestrial Radio Access (E-UTRA); Physical Layer Procedures (Release 8)", 3GPP TS 36.213, V8.2.0 (Mar. 2008).

Third Generation Partnership Project, "Technical Specification Group Radio Access Network; Evolved Universal Terrestrial Radio Access (E-UTRA); Physical Layer Procedures (Release 8)", 3GPP TS 36.213, V8.6.0 (Mar. 2009).

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.1.0 (Mar. 2008).

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.5.0 (Mar. 2009).

(Continued)

*Primary Examiner* — Chi H. Pham
*Assistant Examiner* — Shick Hom
(74) *Attorney, Agent, or Firm* — Volpe and Koenig, P.C.

(57) ABSTRACT

A method for applying a priority of a closed subscriber group (CSG) cell, including receiving priority information for each of a plurality of communication frequencies over which the CSG cell can communicate; storing the priority information at a wireless transmit/receive unit; and applying the priority information to at least one of: taking measurements on a communication frequency, selecting to a CSG cell in the communication frequency, or reselecting to a CSG cell in the communication frequency.

20 Claims, 7 Drawing Sheets

OTHER PUBLICATIONS

Third Generation Partnership Project, "Technical Specification Group Radio Access Network; Evolved Universal Terrestrial Radio Access (E-UTRA); User Equipment (UE) Procedures in Idle Mode (Release 8)", 3GPP TS 36.304, V8.1.0, (Mar. 2008).

Third Generation Partnership Project, "Technical Specification Group Radio Access Network; Evolved Universal Terrestrial Radio Access (E-UTRA); User Equipment (UE) Procedures in Idle Mode (Release 8)", 3GPP TS 36.304, V8.5.0, (Mar. 2009).

Ericsson, "Access restriction for the Home Cell concept in EPS," 3GPP TSG CT WG1 Meeting #48, C1-071909 (Aug. 20-24, 2007).

Nokia et al., "E-UTRA Cell Selection and Cell Reselection Aspects," 3GPP TSG-RAN WG2 Meeting #59bis, R2-074051 (Oct. 2007).

Nokia et al., "E-UTRA Cell Selection and Cell Reselection Aspects," 3GPP TSG-RAN4 Meeting #43bis, R4-071118 (Jun. 2007).

Nokia et al., "E-UTRA Inter-Frequency Cell Reselection Aspects," 3GPP TSG-RAN WG2 Meeting #60, R2-074876 (Nov. 2007).

Nokia et al., "Reselection handling towards non-allowed CSG cell," 3GPP TSG-RAN WG4 Meeting #48bis, R4-082447 (Sep. 29-Oct. 3, 2008).

Nokia Siemens Networks et al., "E-UTRA Measurements and Cell Reselection Considerations," 3GPP TSG-RAN WG2 Meeting #58, R2-071727 (May 2007).

Nokia Siemens Networks et al., "Mobility uses cases based on the access pipe concept," 3GPP TSG-RAN WG2 Meeting #58bis, R2-072388 (Jun. 2007).

Qualcomm Europe, "Restricted Association for HNBs," 3GPP TSG-RAN WG2 #59bis, R2-074406 (Oct. 8-12, 2007).

RAN WG2, "LS on reselection handling towards non-allowed CSG cell," 3GPP TSG RAN WG4 Meeting #48bis, R4-082532 (Sep. 29-Oct. 3, 2008).

Samsung, "Measurement of home & private eNBs," 3GPP TSG-RAN2 Meeting #59, R2-073307(Aug. 20-24, 2007).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.7.0 (Dec. 2008).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.4.0 (Mar. 2008).

Third Generation Partnership Project, "Technical Specification Group Radio Access Network; User Equipment (UE) procedures in idle mode and procedures for cell reselection in connected mode (Release 8)," 3GPP TS 25.304 V8.5.0 (Mar. 2009).

Third Generation Partnership Project, "Technical Specification Group Radio Access Network; User Equipment (UE) procedures in idle mode and procedures for cell reselection in connected mode (Release 8)," 3GPP TS 25.304 V8.1.0 (Mar. 2008).

\* cited by examiner ered to as a HeNB cell, or more commonly, a Closed Subscriber Group (CSG) cell. A HeNB may be used to deploy (usually) one or more CSG cells over the area which LTE coverage is desired. The term CSG cell may be used for a cell deployed by a HeNB for LTE services or by a HNB for WCDMA or other legacy 3GPP RAT services.

CELL SELECTION AND RESELECTION FOR CLOSED SUBSCRIBER GROUP CELLS

CROSS REFERENCE TO RELATED APPLICATIONS

This application claims priority to U.S. Provisional Patent Application No. 61/038,833, filed Mar. 24, 2008, and U.S. Provisional Patent Application No. 61/082,013, filed Jul. 18, 2008, which are incorporated by reference as if fully set forth herein.

FIELD OF INVENTION

This application is related to wireless communications.

BACKGROUND

The current effort for the 3GPP Long Term Evolution (LTE) program is to bring new technology, new architecture, and new methods in the new LTE settings and configurations to provide improved spectral efficiency, reduced latency, and better utilization of the radio resources to bring faster user experiences and richer applications and services with less cost.

As part of these efforts, the 3GPP would like to introduce the concept of a home enhanced Node B (HeNB) in LTE (and also, possibly in a parallel fashion, in Release 8 of WCDMA, GERAN, and other cellular standards). The HeNB refers to a physical device similar to a wireless local area network (WLAN) access point (AP). The HeNB provides users with access to LTE services over extremely small service areas, such as homes or small offices. The HeNB is intended to connect to the operators' core network by using, for example, public Internet connections. This can be particularly useful in areas where LTE has not been deployed and/or legacy 3GPP radio access technology (RAT) coverage already exists. This may also be useful in areas where LTE coverage may be faint or non-existent for radio transmission problems that occur, for example, while in an underground metro or a shopping mall.

The cell (which is the term for the area over which radio coverage provided by the HeNB is available) that is deployed by the HeNB may be accessed only by a group of subscribers who have access to the services of the cell (e.g., a family) and such a cell may be referred to as a HeNB cell, or more commonly, a Closed Subscriber Group (CSG) cell. A HeNB may be used to deploy (usually) one or more CSG cells over the area which LTE coverage is desired. The term CSG cell may be used for a cell deployed by a HeNB for LTE services or by a HNB for WCDMA or other legacy 3GPP RAT services.

Cell selection and reselection criteria for CSG cells are currently an open issue. This raises several other issues:

(1) No priority schemes exist for CSG cells.

(2) The CSG identifier that the WTRU needs to determine whether a CSG cell is configured in its white list is currently in the system information blocks (SIBs). Reading the SIBs for possibly hundreds of CSG cells in a frequency layer might be unnecessarily expensive in terms of time and power consumed.

(3) Other parameters for cell selection and reselection, such as $Q_{hyst}$ and $Q_{offset}$, for CSG cells are undefined.

SUMMARY

Parameters and procedures used for cell selection and cell reselection to CSG cells are disclosed.

A method for applying a priority of a CSG cell, including receiving priority information for each of a plurality of communication frequencies over which the CSG cell can communicate; storing the priority information at a wireless transmit/receive unit; and applying the priority information to at least one of: taking measurements on a communication frequency, selecting to a CSG cell in the communication frequency, or reselecting to a CSG cell in the communication frequency.

Methods relating to grouping CSG cells, indicating a status of a CSG cell, processing multiple CSG cells by a WTRU, reselecting between CSG cells by a WTRU, and manual CSG cell selection by a WTRU are also disclosed.

BRIEF DESCRIPTION OF THE DRAWINGS

A more detailed understanding may be had from the following description, given by way of example in conjunction with the accompanying drawings, wherein.

DETAILED DESCRIPTION

When referred to hereafter, the term "wireless transmit/receive unit (WTRU)" includes, but is not limited to, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the term "base station" includes, but is not limited to, a Node B, a site controller, an access point (AP), or any other type of interfacing device capable of operating in a wireless environment.

Figure 1:
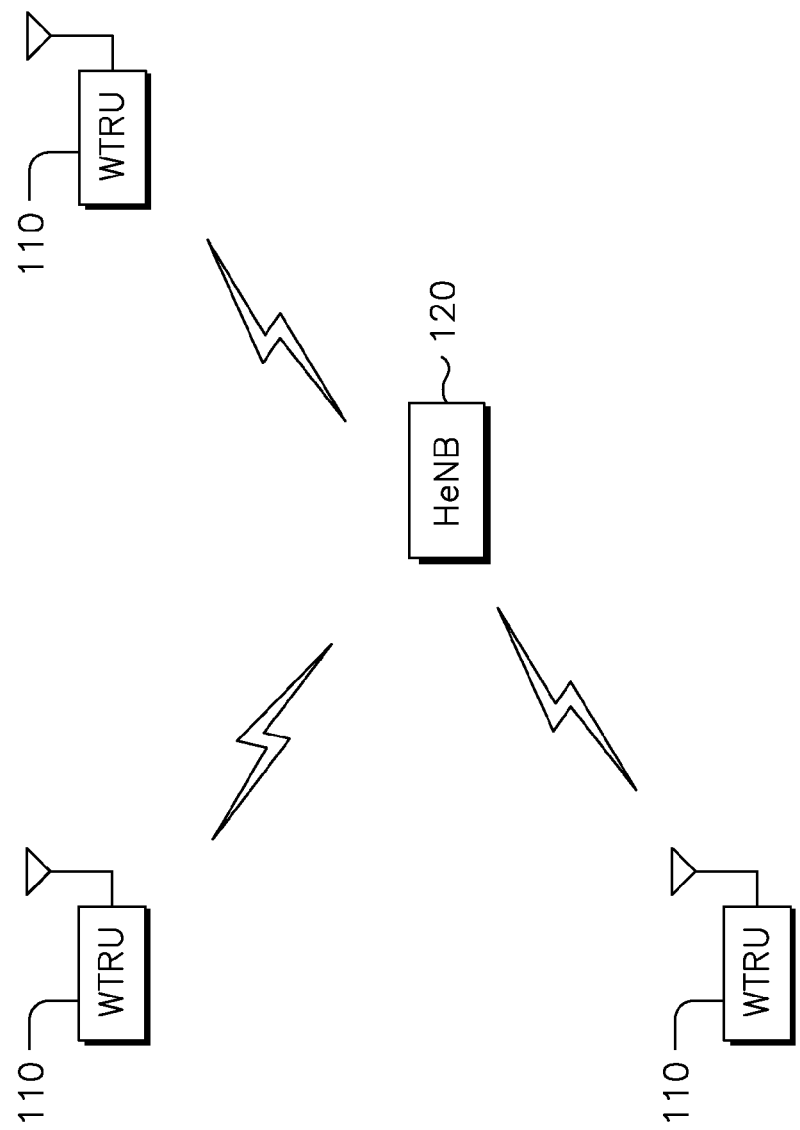
FIG. 1 shows an example wireless communication system including a plurality of wireless transmit/receive units (WTRUs) and a home enhanced Node B (HeNB)

FIG. 1 shows an example wireless communication system 100 including a plurality of WTRUs 110 and an HeNB 120. As shown in FIG. 1, the WTRUs 110 are in communication with the HeNB 120. It is noted that, although an example configuration of WTRUs 110 and an HeNB 120 is depicted in FIG. 1, any combination of wireless and wired devices may be included in the wireless communication system 100.

Figure 2:
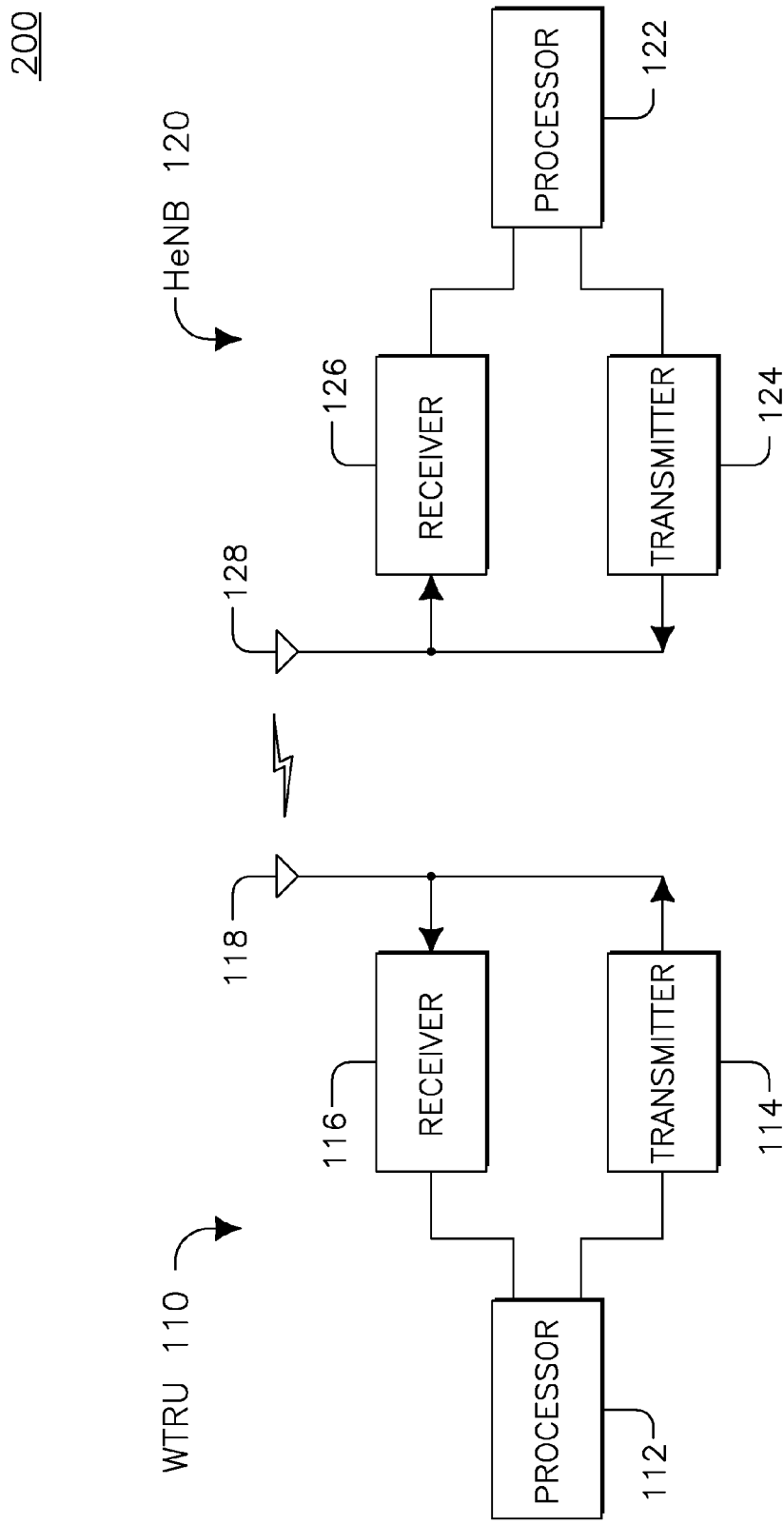
FIG. 2 is an example functional block diagram of one WTRU and the HeNB of FIG. 1.

FIG. 2 is an example functional block diagram 200 of a WTRU 110 and the HeNB 120 of the wireless communication system 100 of FIG. 1. As shown in FIG. 2, the WTRU 110 is in communication with the HeNB 120.

In addition to the components that may be found in a typical WTRU, the WTRU 110 includes a processor 112, a transmitter 114, a receiver 116, and an antenna 118. The transmitter 114 and the receiver 116 are in communication with the processor 112. The antenna 118 is in communication with both the transmitter 114 and the receiver 116 to facilitate the transmission and reception of wireless data. The processor 112 of the WTRU 110 is configured to perform cell selection and reselection.

In addition to the components that may be found in a typical HeNB, the HeNB 120 includes a processor 122, a transmitter 124, a receiver 126, and an antenna 128. The transmitter 124 and the receiver 126 are in communication with the processor 122. The antenna 128 is in communication with both the transmitter 124 and the receiver 126 to facilitate the transmission and reception of wireless data. The processor 122 of the HeNB 120 is configured to provide information to the WTRU 110 usable for cell selection and reselection.

CSG Cells and the WTRU's White List

The WTRU can only access those CSG cells that are in a white list stored at the WTRU. If the WTRU attempts to access a CSG cell that is not in the white list, the network may reject that access. Under normal operating procedures, the WTRU first checks if a CSG cell is in its white list, and only if the CSG cell is in the white list should the WTRU then proceed to reselect to it.

To populate the white list, the network provides over the air signaling of the white list. The white list is written to the Universal Mobile Telecommunications System (UMTS) subscriber identity module (USIM) at the WTRU. The non-access stratum (NAS) reads the USIM and populates the white list in the WTRU. This is one example of an Open Mobile Alliance (OMA) protocol to populate the WTRU's white list; the specific implementation is network-specific. Generally, the network can put WTRU-specific information on the USIM, the NAS reads the information from the USIM, and the NAS further processes the information.

If the network sets a CSG cell as a public CSG cell, the WTRU does not need to have that CSG cell in the white list. The WTRU can just access the CSG cell, as the network knows that it is a public CSG cell.

Priority Scheme for CSG Cells

The network signals the priority of the CSG cell frequencies to the WTRU. The WTRU can camp on the CSG cell with the highest priority frequency. Based on the priority of the frequencies, the WTRU will know the order in which it should search the frequencies. It is possible for two different CSG cells to be assigned the same priority. In this instance, the WTRU may implicitly assign a higher priority to one of the CSG cells.

In the event that all CSG cells are deployed on a single frequency (also known as the CSG frequency), a macro cell (i.e., a non-CSG cell) may signal the priority of the CSG frequency by broadcast or dedicated signaling. The macro cell may identify the frequency as being one for CSG cells only. There may be more than one CSG frequency.

A WTRU with no entries configured in its CSG white list can disregard the signaled priority for the CSG frequency and will not try to initiate measurements, cell selection, or cell reselection to any cell on that frequency. If however, CSG cells are deployed on the same frequency as the surrounding macro cells, then such a frequency may not be marked as a CSG frequency.

Alternatively, the WTRU may be pre-configured with the frequencies of the CSG cells it has access to and the macro cell may indicate the priority for CSG frequencies by dedicated or broadcast signaling without indicating the actual frequency. WTRUs which have CSG cells and associated frequencies configured in their white list would apply the signaled priority to these frequencies.

Alternatively, the priority scheme for the frequency of CSG cells could be pre-configured in the WTRU. The configuration of the priority scheme can be sent via radio resource control (RRC)/NAS signaling or via upper layer signaling (e.g., SMS, OMA Device configuration, etc.). In one embodiment, the configuration of the frequencies could be done as part of the message which configures the CSG white list in the WTRU.

In addition, cell-specific priorities for CSG cells are proposed. A CSG cell configured in a white list may have a higher priority than a macro cell. Priorities of individual CSG cells versus one another may be determined via their broadcast signaling, by their position on the white list, manually entered by the user, by virtue of their group assignment (described below), or because they are determined to be public CSG cells. CSG cell priorities may be used to determine the outcome of a cell reselection between CSG cells. Alternatively, when a cell reselection is considered between a CSG cell and a macro cell, the macro cell can be assumed to have the lowest priority by default, unless the priority is specifically marked with the macro cell.

Figure 3:
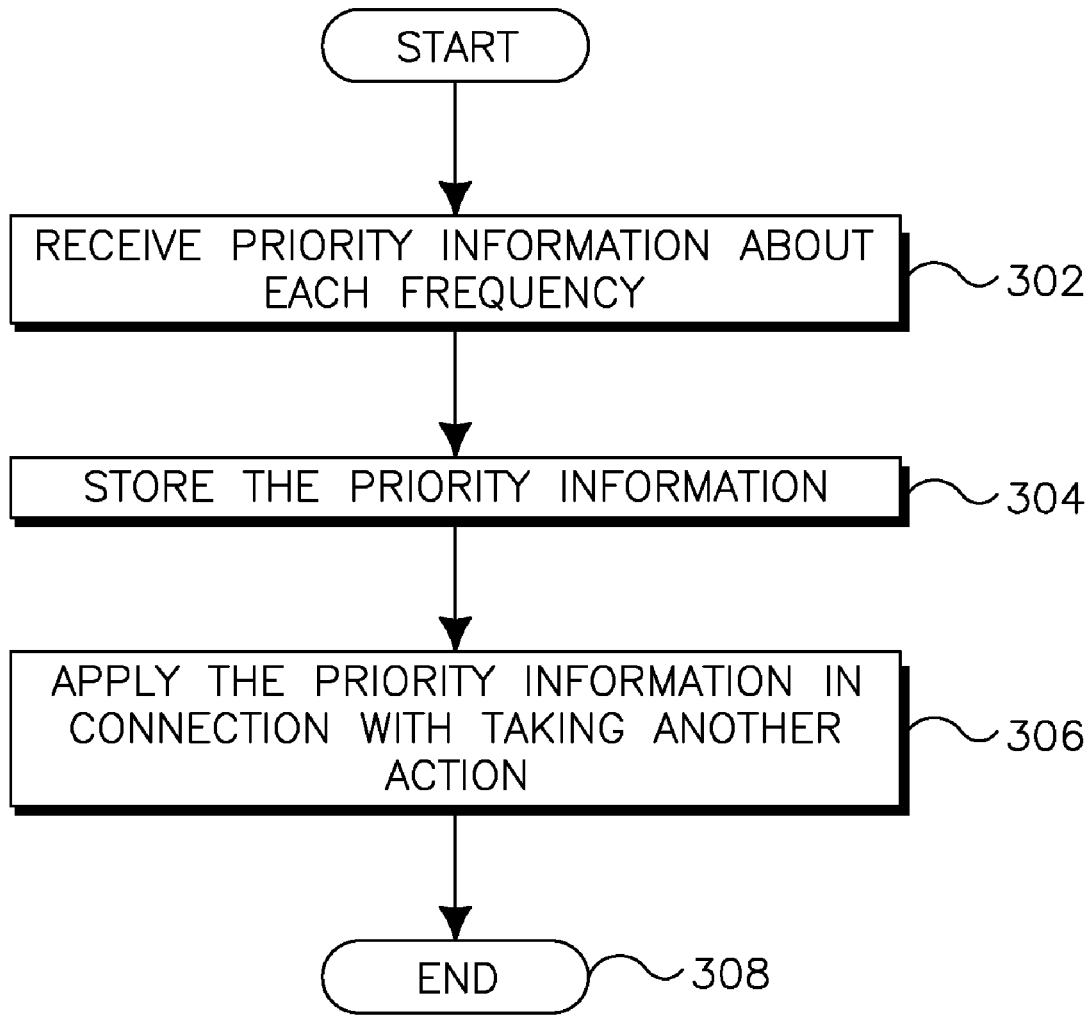
FIG. 3 is a flowchart of a method for grouping CSG cells.

FIG. 3 is a flowchart of an exemplary method 300 for grouping CSG cells by a WTRU. The WTRU receives priority information about each frequency on which the WTRU can communicate (step 302) and stores the priority information (step 304). The WTRU applies the priority information in connection with taking another action (step 306), as described above. The method then terminates (step 308).

Grouping CSG Cells

CSG cells can be grouped based on the purpose for using the CSG cell, such as a home, an office, a shopping mall, etc. Each group is distinguished by an identifier (ID). The grouping is done to easily identify the group type. The WTRU can determine, by reading the first few bits of the CSG cell identifier (for example), whether a CSG cell is a type of CSG cell that the WTRU is searching for. A WTRU subscribed to a CSG cell can only access the particular CSG cells in its white list, and cannot access other CSG cells in the same group unless those CSG cells are also in the white list.

In one implementation, the group ID is placed at the beginning of the CSG ID, so that the group ID is first and the cell ID is second. By arranging the CSG ID in this way, a WTRU can just read the group ID portion to determine if the CSG cell may be acceptable for use.

When a WTRU detects a CSG cell, it may read its group ID to determine if this CSG cell has the same group ID as one that is configured in its white list. If the detected CSG cell has a group ID that matches the group ID of a CSG cell in the white list, the WTRU will continue to acquire the SIBs to verify the upper layer CSG ID (e.g., CSG TA ID). This procedure may be done as an alternative to or in addition to matching the PCID or frequency of a detected cell with that of a CSG cell configured in the white list.

The group ID may be configured in the WTRU as part of CSG white list configuration. The group ID may be smaller than the CSG ID (e.g., the CSG tracking area (TA) ID). The group ID may be signaled on a physical channel, on the management information base (MIB), on any SIB, or on a fast-changing SIB. The group ID may be certain reserved physical layer cell IDs (PCIDs). Public CSG cells may be in a different group and may have a different group ID than private CSG cells.

Additionally, instead of preventing WTRUs from camping on certain groups of HeNB cells, the WTRU could be given a priority order for the HeNB groups and WTRU could try and select a cell from the HeNB group in that order.

The existing space for the eNB ID and cell ID in SIB1 may be re-dimensioned for CSG use. Currently, 20 bits are assigned for the eNB ID and 8 bits are assigned for the cell ID. If the cell is a CSG cell (determined by using, e.g., a one bit CSG indicator on SIB1 or a reserved PCID for CSG cells), then 20 bits or more may be used to identify the HeNB and 8 bits or less are used to identify the CSG cell of that HeNB. The total number of bits used remains 28 bits or a few more than 28 bits (optional bits that are included only if cell is a CSG cell). The CSG ID could then be the HeNB ID plus the cell ID.

Alternatively, some bits or some indication may let the WTRU know the size of the HeNB ID and the cell ID fields. For example, a class indication which maps to pre-defined configurations for HeNB and cell ID sizes to specific code-point values on an indicator may be used. As an example, there could be four classes, each with different sizes of HeNB ID and cell ID. Two bits on SIB1 can be used to indicate the specific class, so that upon reading the two bits, the WTRU knows how many bits are the HeNB ID and how many bits are the cell ID.

A separate CSG ID can be defined that identifies the specific closed user group the CSG cell is intended to serve. This CSG ID may be distinct from the HeNB ID and the cell ID, and may be the ID that is actually programmed in the WTRU's white list. This CSG ID may be at least 27 bits long, may be broadcast by the CSG cell, and may be in SIB1 or SIB9.

Cell Reselection Parameters for CSG Cells

A CSG cell may carry an indication (e.g., one bit) on the broadcast channel of whether the cell is a public CSG cell or a private CSG cell. This indication may be optional or may only be used if the CSG cell is public or private. If this indicator is absent and the CSG indicator is set to true, the WTRU may automatically assume that the CSG cell in question is either public or private.

The following is a list of parameters that may be used for CSG cell reselection and indicates, for example, when to reselect to a CSG cell, when to reselect to a macro cell, and when to take measurements. For example, a parameter can indicate that the signal strength of the CSG cell is checked, and the WTRU can reselect to that CSG cell if it meets the reselection criteria and is configured in the WTRU's white list.

(1) The parameter $Q_{rxlevmin}$ is different for CSG cells than for macro HeNB cells.

(2) A new cell selection parameter called $S_{CSGsearch}$. If $S_{servingcell} > S_{CSGsearch}$, then the WTRU may not autonomously search for CSG cells. The WTRU may still search for CSG cells if the user manually instructs the WTRU to do so. The parameter $S_{CSGsearch}$ may be greater than $S_{intrasearch}$ and/or greater than $S_{intersearch}$. The WTRU may apply this scheme to manual searches only, but not to an autonomous search. The parameter $S_{CSGsearch}$ may be different for autonomous searches and manual searches.

(3) A new cell selection parameter called $S_{CSGsearchneigh}$. If $S_{nonservingCSGcell} > S_{CSGsearchneigh}$, then the WTRU may measure that non-serving CSG cell and include it as part of the reselection process.

(4) A new parameter called $Thresh_{CSG,high}$. If the WTRU is moving from a macro cell to a CSG cell and $S_{nonservingCSGcell} > Thresh_{CSG,high}$, then the WTRU may reselect to the CSG cell, provided that the CSG cell is configured in its white list or is otherwise accessible (e.g., a public CSG cell).

(5) If the WTRU is moving from one CSG cell to another, the above condition ($S_{nonservingCSGcell} > Thresh_{CSG,high}$) may only be applied if the neighbor CSG cell is in a higher priority frequency, a higher priority group, or is of a higher priority (determined, for example, using its position on the white list). Alternatively, the WTRU reselects to the higher priority CSG cell (e.g., by the white list position) regardless of the signal strength, as long as both cells' measured signals are above the minimum signal requirement.

(6) A new parameter called $T_{CSGreselection}$. If the WTRU is moving from a macro cell to a CSG cell and $S_{nonservingCSGcell} > Thresh_{CSG,high}$ for a time $T_{CSGreselection}$, then the WTRU may reselect to the CSG cell provided that the CSG cell is configured in its white list or is otherwise accessible (e.g., a public CSG cell).

(7) If the WTRU is moving from one CSG cell to another, the above condition ($S_{nonservingCSGcell} > Thresh_{CSG,high}$ for time $T_{CSGreselection}$) may only be applied if the neighbor CSG cell is in a higher priority frequency or a higher priority group.

(8) If the WTRU is moving from a macro cell to a CSG cell and $S_{nonservingCSGcell} > 0$, then the WTRU may reselect to the CSG cell provided that the CSG cell is configured in its white list or is otherwise accessible (e.g., a public CSG cell).

(9) If the WTRU is moving from one CSG cell to another and if $S_{nonservingCSGcell} > 0$ and $S_{servingCSGcell} < S_{CSGsearch}$ or $S_{servingCSGcell} < 0$, then the WTRU may reselect to the CSG cell provided that the CSG cell is configured in its white list or is otherwise accessible (e.g., a public CSG cell).

(10) If the WTRU is moving from a macro cell to a CSG cell and $S_{nonservingCSGcell} > 0$ for time $T_{CSGreselection}$, then the WTRU may reselect to the CSG cell provided that the CSG cell is configured in its white list or is otherwise accessible (e.g., a public CSG cell).

(11) If the WTRU is moving from one CSG cell to another and if $S_{nonservingCSGcell} > 0$ and $S_{servingCSGcell} < S_{CSGsearch}$ or $S_{servingCSGcell} < 0$ for time $T_{CSGreselection}$, then the WTRU may reselect to the CSG cell provided that the CSG cell is configured in its white list or is otherwise accessible (e.g., a public CSG cell).

(12) The parameters $S_{servingcell}$, $S_{nonservingCSGcell}$, and $S_{servingCSGcell}$ are S criteria parameters and can be calculated in the same manner as for the macro cell or by using any other equation.

(13) A new parameter called $Q_{offsetCSG}$ may be signaled by the macro cell and applied to CSG cells for ranking them.

(14) A new parameter called $Q_{hystCSG}$ may be signaled by the macro cell and applied to the current serving macro cell.

(15) A new parameter called $Q_{hystCSGserving}$ may be signaled by the current CSG cell and applied to the current serving CSG cell in case the WTRU is moving from one CSG cell to another or moving from a CSG cell to a macro cell.

(16) If the autonomous CSG cell search algorithm determines that a CSG cell that the WTRU has access to is nearby and should be searched for, those measurements will be made regardless of the S value of the serving macro cell.

(17) If a CSG cell (either in the white list or manually selected) is not the best cell on a frequency, then the WTRU may still reselect to this cell provided at least one of the following is met.
- (a) The CSG cell meets some minimum signal criteria (e.g., $S_{nonservingCSGcell} > Thresh_{CSG,high}$).
- (b) There is no other higher priority cell available (e.g., a higher priority CSG cell).
- (c) The serving cell (macro cell or a CSG cell) is above a certain threshold (e.g., $S_{servingcell} < S_{tolerateinterference}$). This threshold may be different depending on if the serving cell is a macro cell or CSG cell.
- (d) The CSG cell is within a certain offset of the serving cell.
- (e) The CSG cell is within a certain offset of other cells that are higher ranking based on measurements.
- (f) The CSG cell is at least a certain offset below the serving cell.
- (g) The CSG cell is at least a certain offset below other cells that are higher ranking based on measurements.

Normally, when a WTRU makes inter-frequency measurements and discovers multiple cells which are satisfactory, it ranks the cells and camps on the best cell. If a WTRU makes measurements on a frequency known to be a CSG frequency and detects multiple CSG cells, it will do at least one of the following.

(1) Disregard cells whose frequency information does not match an entry in the CSG white list or a CSG cell that is otherwise accessible (e.g., a public CSG cell). The frequency information may be the band, center frequency.

(2) Disregard a cell whose PCID does not match an entry in the CSG white list or a CSG cell that is otherwise accessible (e.g., a public CSG cell).

(3) Disregard cells whose group ID do not match an entry in the CSG white list or a CSG cell that is otherwise accessible (e.g., a public CSG cell).

(4) Rank the cells.

(5) Reselect to and camp on the best ranked cell.

Figure 4:
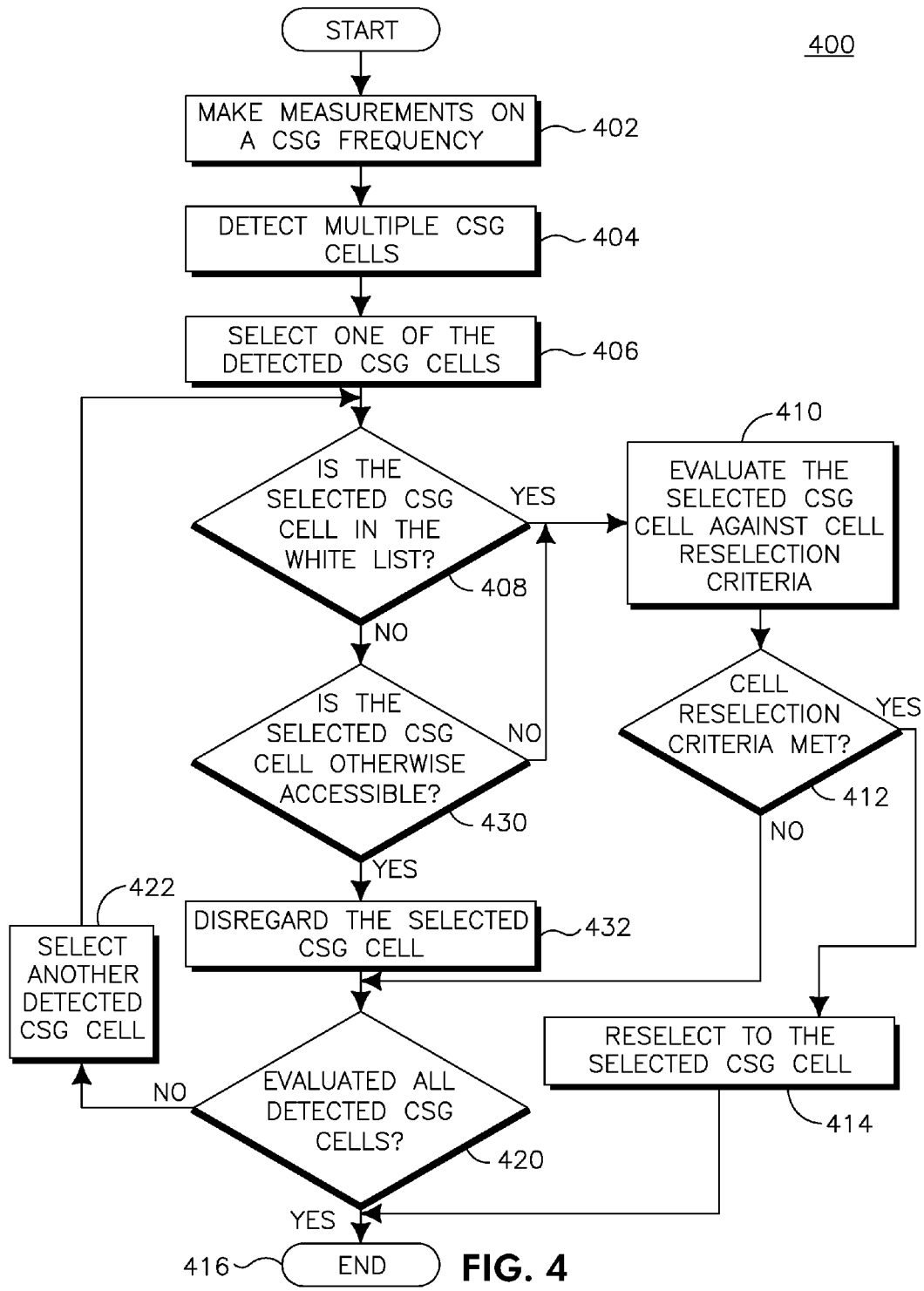
FIG. 4 is a flowchart of a method for processing multiple CSG cells.

FIG. 4 is a flowchart of an exemplary method 400 for processing multiple CSG cells by a WTRU. The WTRU makes measurements on a CSG frequency (step 402) and detects multiple CSG cells (step 404). The WTRU selects one of the detected CSG cells for further evaluation (step 406).

A determination is made whether the selected CSG cell is in the WTRU's white list (step 408). If the selected CSG cell is in the WTRU's white list, then the selected CSG cell is evaluated against the cell reselection criteria (step 410). If the cell reselection criteria is met (step 412), then the WTRU reselects to the selected CSG cell (step 414) and the method terminates (step 416).

If the cell reselection criteria is not met (step 412), then a determination is made whether all of the detected CSG cells have been evaluated (step 420). If all of the detected CSG cells have been evaluated, then the method terminates (step 416). If all of the detected CSG cells have not been evaluated (step 420), then the WTRU selects another detected CSG cell (step 422) and this CSG cell is evaluated, beginning with step 408 as described above.

If the selected CSG cell is not in the WTRU's white list (step 408), then a determination is made whether the selected CSG cell is otherwise accessible (i.e., if it is a public CSG cell; step 430). If the selected CSG cell is not otherwise accessible, the selected CSG cell is still evaluated against the cell reselection criteria (step 410), as described above. If the selected CSG cell is otherwise accessible (step 430), then the selected CSG cell is disregarded (step 432). Next, a determination is made whether all of the detected CSG cells have been evaluated (step 420). If all of the detected CSG cells have been evaluated, then the method terminates (step 416). If all of the detected CSG cells have not been evaluated (step 420), then the WTRU selects another detected CSG cell (step 422) and this CSG cell is evaluated, beginning with step 408 as described above.

(6) In the event that the search was triggered by a manual search request from the user, present the detected cells to the user. The WTRU may only present those CSG cells to the user whose PCID, frequency information, or group ID matches an entry in the CSG white list or a CSG cell that is otherwise accessible (e.g., a public CSG cell). The notification to the user may indicate that these cells have a high probability of being the correct CSG cell to which the user has access or a CSG cell that is otherwise accessible (e.g., a public CSG cell). The WTRU may proceed to acquire the SIBs of a particular CSG cell only upon receiving user input. The WTRU may prompt the user for receiving the command to acquire the SIBs. Alternatively, all of the detected CSG cells may be presented to the user.

Figure 5:
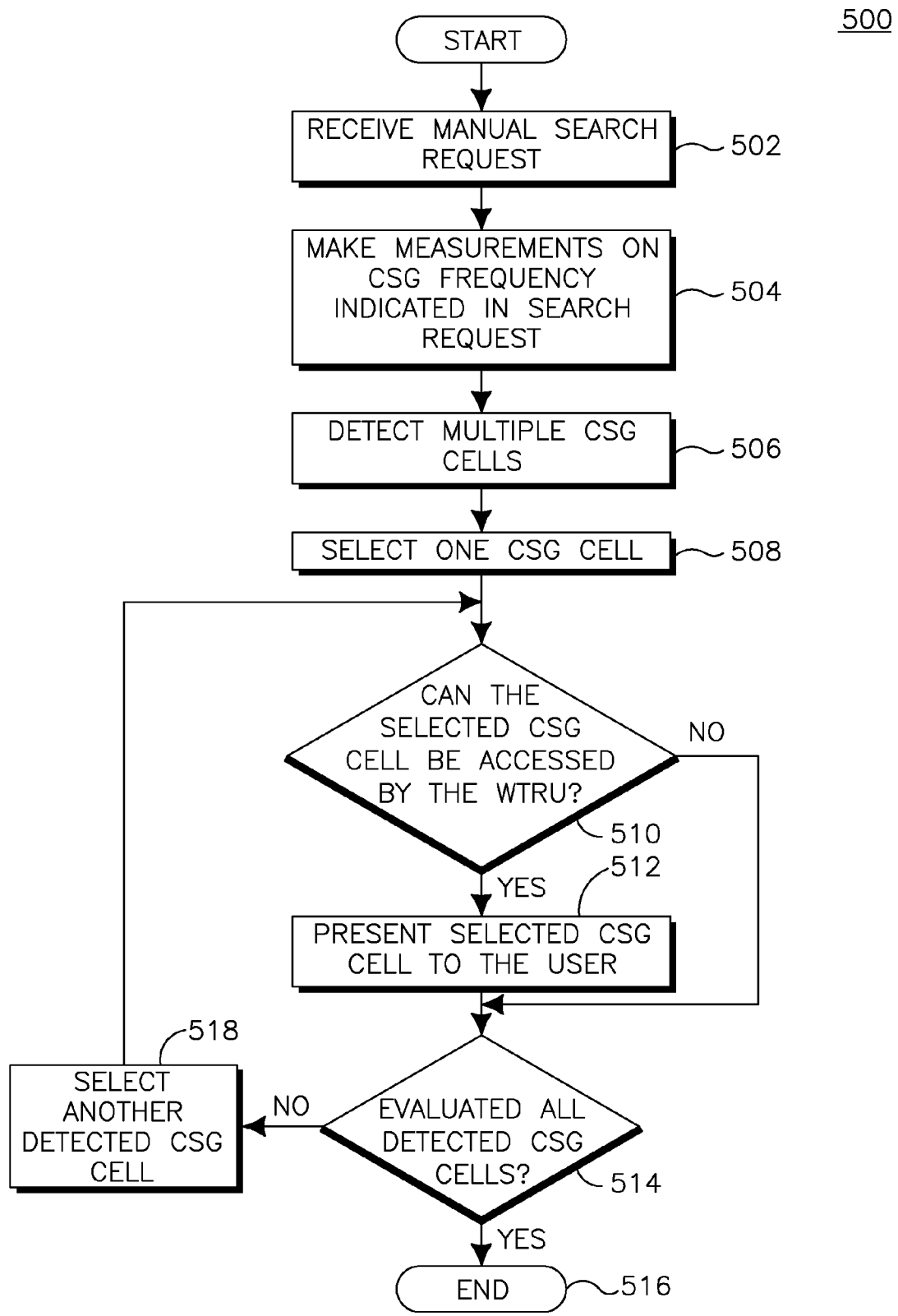
FIG. 5 is a flowchart of a second method for processing multiple CSG cells.

FIG. 5 is a flowchart of a second exemplary method 500 for processing multiple CSG cells by a WTRU. The WTRU receives a manual search request from a user (step 502). The WTRU makes measurements on the CSG frequency indicated in the manual search request (step 504). The WTRU detects multiple CSG cells (step 506) and selects one of the detected CSG cells for further evaluation (step 508).

A determination is made whether the selected CSG cell can be accessed by the WTRU (step 510). If the selected CSG cell can be accessed by the WTRU, then the selected CSG cell is presented to the user of the WTRU (step 512). Next, a determination is made whether all of the detected CSG cells have been evaluated (step 514). If all of the detected CSG cells have been evaluated, then the method terminates (step 516). If all of the detected CSG cells have not been evaluated (step 514), then the WTRU selects another detected CSG cell (step 518) and this CSG cell is evaluated, beginning with step 510 as described above.

If the selected CSG cell cannot be accessed by the WTRU (step 510), then a determination is made whether all of the detected CSG cells have been evaluated (step 514). If all of the detected CSG cells have been evaluated, then the method terminates (step 516). If all of the detected CSG cells have not been evaluated (step 514), then the WTRU selects another detected CSG cell (step 518) and this CSG cell is evaluated, beginning with step 510 as described above.

(7) Acquire the SIBs of the camped cell and verify if the upper layer ID (e.g., the CSG ID, such as the CSG TA ID) matches an entry stored in the CSG white list.

(8) If the upper layer ID (e.g., the CSG ID, such as the CSG TA ID) does not match an entry stored in the CSG white list or of a CSG cell that is otherwise accessible (e.g., a public CSG cell) then the WTRU realizes that the HeNB cell was not suitable for cell reselection (e.g., the HeNB cell could be barred or belong to another operator) and the WTRU may do at least one of the following in any order.

(a) Revert to camping on the macro cell.

(b) Revert to camping on the macro cell only if macro cell was above a certain threshold.

(c) Initiate cell reselection procedures.

(d) Camp and acquire the SIBs of the next best CSG cell.

(e) Camp and acquire the SIBs of the next best CSG cell only if the reselection was initiated by a manual selection.

(f) If acquiring the SIBs or reselection was triggered by manual input from user, then the WTRU may notify the user of the failure to reselect to the CSG cell. The WTRU may ask the user if he wants to initiate reselection or acquiring the SIBs of another possible candidate CSG cell (i.e., one whose PCID, group ID, or frequency information matched an entry in the white list or a CSG cell that is otherwise accessible (e.g., a public CSG cell)) or wants to revert back to a macro cell or the last camped cell. If the user indicates that he wants to reselect to the next possible candidate CSG cell, then the WTRU would again initiate acquiring the SIBs, etc., as described above.

Figure 6:
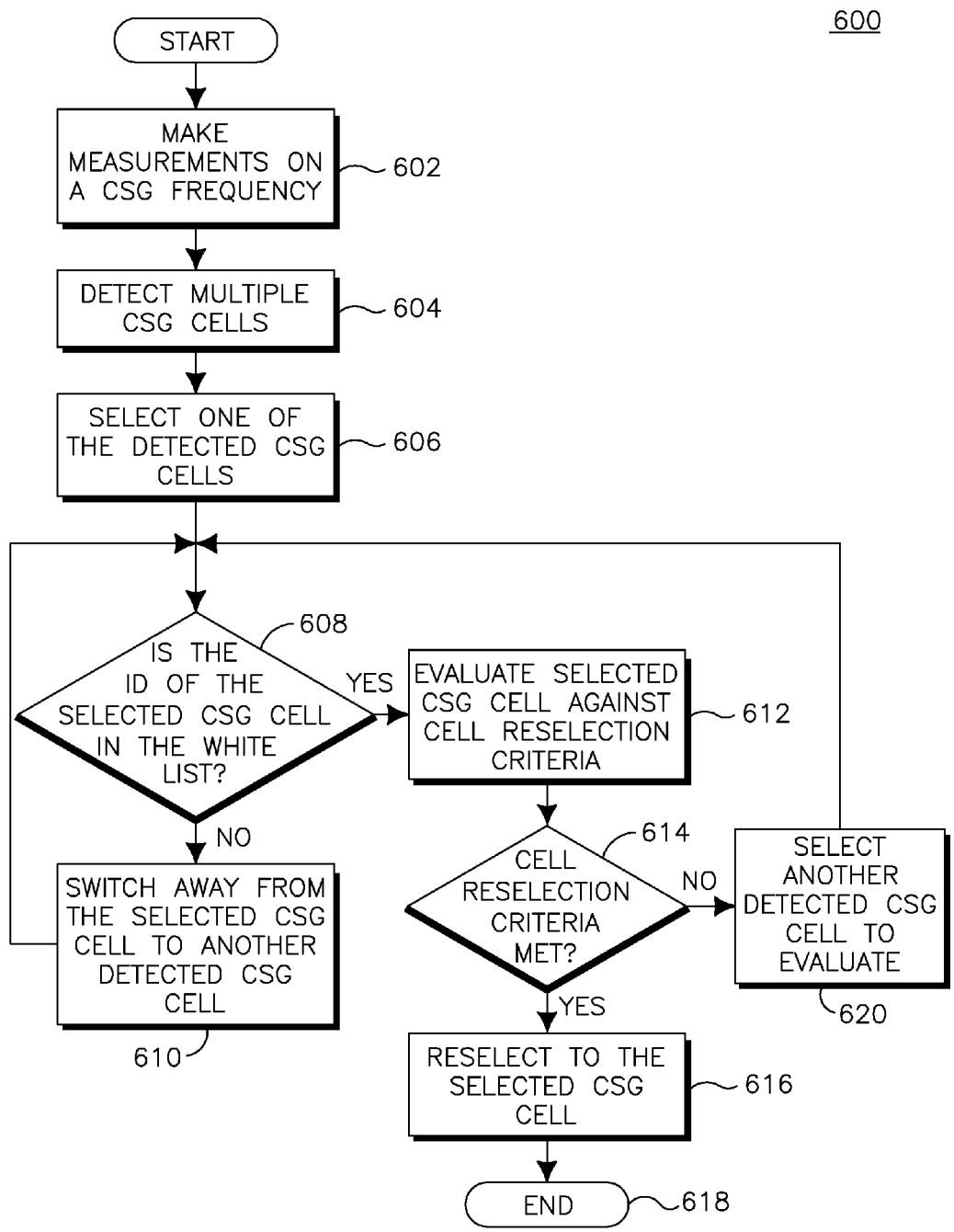
FIG. 6 is a flowchart of a third method for processing multiple CSG cells.

FIG. 6 is a flowchart of a third exemplary method 600 for processing multiple CSG cells by a WTRU. The WTRU makes measurements on the CSG frequency (step 602). The WTRU detects multiple CSG cells (step 604) and selects one of the detected CSG cells for further evaluation (step 606).

A determination is made whether the ID of the selected CSG cell is in the WTRU's white list (step 608). If the selected CSG cell is not in the WTRU's white list, then the WTRU switches away from the selected CSG cell to another detected CSG cell, using any of items (a) through (f) above (step 610).

If the ID of the selected CSG cell is in the WTRU's white list (step 608), then the selected CSG cell is evaluated against the cell reselection criteria (step 612). If the cell reselection criteria is met, then the WTRU reselects to the selected CSG cell (step 616) and the method terminates (step 618). If the cell reselection criteria is not met (step 614), then the WTRU selects another detected CSG cell to evaluate (step 620) and this CSG cell is evaluated, beginning with step 608 as described above.

(9) If the upper layer ID (e.g., the CSG ID, such as the CSG TA ID) matches an entry stored in the CSG white list or of a CSG cell that is otherwise accessible (e.g., a public CSG cell) then the WTRU may notify the user of the successful reselection.

The PCID of a CSG cell may be reconfigured by the user or with operator assistance. This configuration may be, for example, based on a user decision to reconfigure. For example, if the user feels that he has to manually select many cells before camping on the correct one, he might configure the HeNB to pick a new PCID. The HeNB could select a new PCID from a reserved set of PCIDs and notify the user of the PCID or frequency information selected (e.g., via the display). The user could also manually configure the PCID or frequency used by a CSG cell in its white list.

The manual search or selection by the user could use certain parameters from the autonomous search to make it more efficient. For example, if the user initiates a manual search and the autonomous search configuration has just been completed (within some time T), or the autonomous search configuration indicates that there should not be any CSG cell in the vicinity (e.g., using neighbor cell configurations or using broadcast information), the user could be given an appropriate notification and be asked to re-confirm the search parameters. The manual search could command the WTRU to provide the user with all available CSG cells (e.g., even those that are not in the white list or meet some radio related criteria). The user may be allowed to manually set or edit the priority of the CSG cells in the white list. The priority of CSG cells may be with respect to each other or with respect to macro cells, i.e., certain CSG cells may be of a lower priority than macro cells.

In addition, manual selection of a CSG cell may be allowed to override the public land mobile network (PLMN) criteria for cell selection or reselection. For example, a CSG cell that is barred because its PLMN belongs to a forbidden PLMN may be selected by the WTRU during cell selection or reselection even if other suitable cells exist, if commanded to do so by the user or if the CSG ID of that CSG cell is in the white list. Further, if a WTRU is camped on a CSG cell belonging to a particular PLMN, it may disable the search for higher priority PLMNs or background PLMN search during this time. This procedure (disabling higher priority or background PLMN scan) may apply in at least one of the following cases:

(1) The WTRU is camped on a manually selected CSG cell.
(2) The WTRU is camped on a CSG cell that is in its white list.
(3) The WTRU is camped on a high priority CSG cell. The priority of the CSG cell may be indicated on the broadcast channel of the CSG cell or configured in the WTRU (e.g., in the white list using RRC/NAS signaling, manually entered, or through other techniques such as OMA Device Management).

When a WTRU attempts to reselect to a cell that is barred by the network (meaning that the WTRU cannot camp on that cell), the network sets an intra-frequency reselection indicator to false. Setting this indicator means that if a cell is barred, the WTRU cannot camp on any other cell in the same frequency and needs to move to another frequency. This bit was used in UTRAN systems and broadcast on a macro cell. If the bit was set, then intra-frequency cell reselection was allowed. The CSG cell may not use this indication to disallow intra-frequency cell reselection. Even if the CSG cell indicates that intra-frequency cell reselection is not allowed, the WTRU may search for, measure, and reselect to a CSG cell on that frequency if it is in the white list or is otherwise accessible (e.g., a public CSG cell) and/or meets any other criteria (e.g., the radio criteria defined above). In other words, the WTRU can ignore the intra-frequency reselection indicator.

Similarly, a CSG cell can set this indicator to false. But the WTRU may override this setting and continue to search on the same frequency for other cells.

Figure 7:
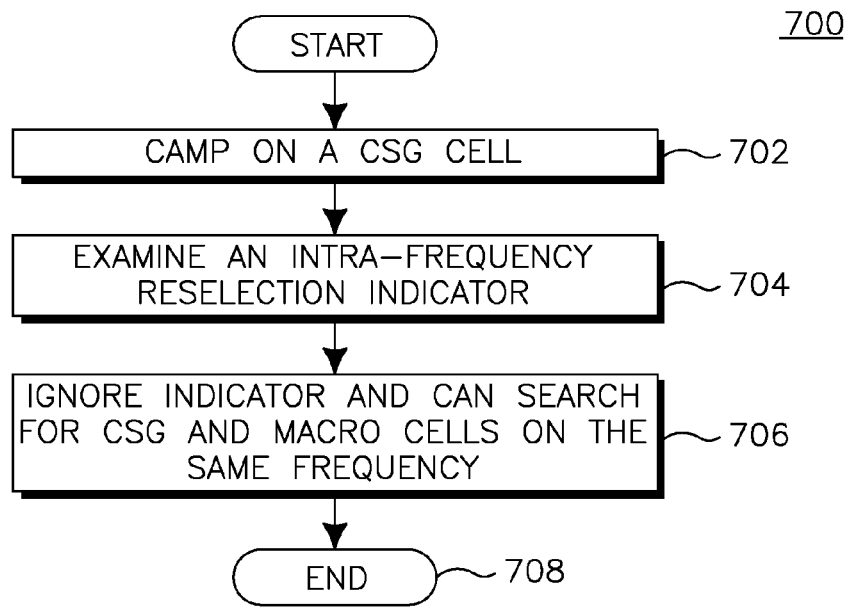
FIG. 7 is a flowchart of a method for reselecting between CSG cells.

FIG. 7 is a flowchart of an exemplary method 700 for reselecting between CSG cells by a WTRU. The WTRU camps on a CSG cell (step 702) and examines an intra-frequency reselection indicator (step 704). The WTRU can ignore the indicator (even if set to false) and can search for CSG cells and macro cells on the same frequency (step 706). The method then terminates (step 708).

As part of the manual selection, the WTRU access stratum (AS) may filter the detected CSG cells which it presents to the NAS based on some radio-related criteria. As an example, it may only present those CSG cells to the NAS that are above or equal to a certain threshold. Alternatively, it may only present those CSG cells detected to the NAS which are below a certain threshold.

Figure 8:
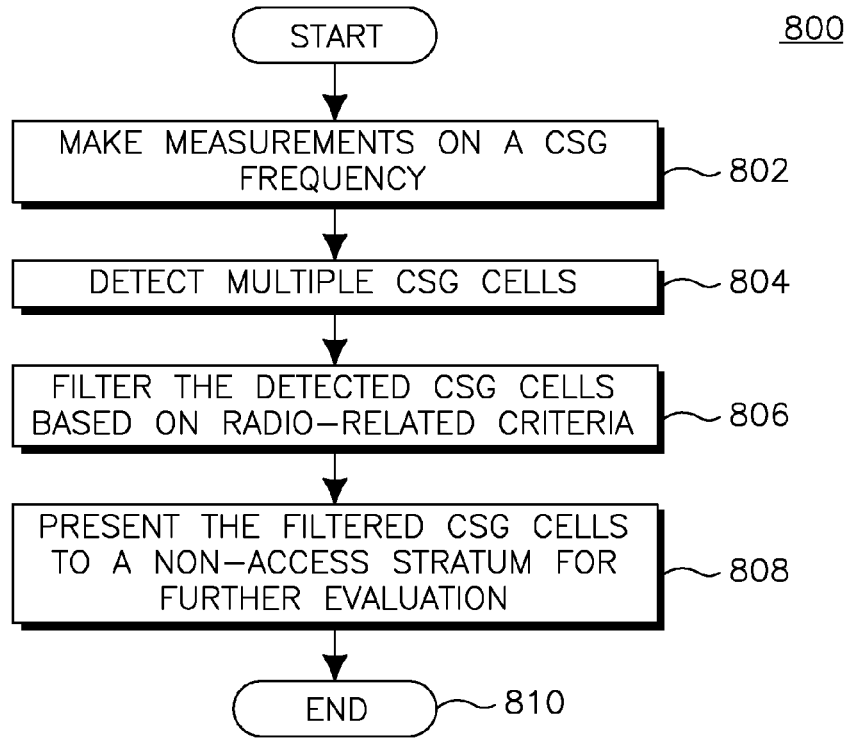
FIG. 8 is a flowchart of a method for manual CSG cell selection.

FIG. 8 is a flowchart of an exemplary method 800 for manual CSG cell selection by a WTRU. The WTRU makes measurements on the CSG frequency (step 802). The WTRU detects multiple CSG cells (step 804) and filters the detected CSG cells based on radio-related criteria (step 806). The filtered cells are presented to the NAS for further evaluation (step 808) and the method terminates (step 810).

Once the user manually selects a cell, the WTRU may not initiate reselection out of the cell for a predetermined period of time. This time may be longer than the normal $T_{reselection}$ for which the S criteria are evaluated. Alternatively, the WTRU may initiate reselection right away. The WTRU may apply different reselection parameters to the manually selected CSG cell than the ones which are broadcast by the CSG cell or scale the broadcasted reselection parameters by some value.

Idle Mode Measurements and Procedures

The WTRU can use discontinuous reception (DRX) measurement gaps. If the signal strength is greater than a threshold and the WTRU knows that it is near a CSG cell that it wants to be in, then the WTRU can override the DRX gaps provided by the network and use the DRX measurement gaps to take the necessary measurements. The WTRU can utilize GPS location to check if it is close to its home CSG cell. As the WTRU gets closer to its home CSG cell (e.g., within the footprint area), it can begin searching for the home CSG cell. The following indicates that thresholds that this can be based on.

(1) In the Idle mode, if the WTRU is camped on a macro cell and either the autonomous CSG search (e.g., using a footprint) or the manual CSG search is triggered that requires the WTRU to make intra-frequency measurements, then even if $S_{servingcell} > S_{intrasearch}$, the WTRU will make the measurements required and search for the CSG cell using the appropriate gaps (e.g., the DRX cycle idle time). If the autonomous CSG search or the manual CSG search triggered requires the WTRU to make inter-frequency measurements, then even if $S_{servingcell} > S_{intersearch}$, the WTRU will make the measurements required and search for the CSG cell using the appropriate gaps (e.g., the DRX cycles).

(2) The WTRU does not make any measurements and/or search for any CSG cell.

(3) The method used may vary depending on the type of frequency. For example, in case of intra-frequency the WTRU searches, but in case of inter-frequency the WTRU does not, or vice-versa.

(4) The method used may vary depending on the type of search. For example, in case of an autonomous search, the WTRU does not measure intra-frequency or inter-frequency if $S_{servingcell} > S_{intrasearch}$ or $S_{servingcell} > S_{intersearch}$, respectively. But in case of a manual search, if $S_{servingcell} > S_{intrasearch}$ or $S_{servingcell} > S_{intersearch}$, the WTRU initiates intra-frequency or inter-frequency measurements, or vice-versa.

(5) In the event that a manual search was requested by the user and for some reason the WTRU does not perform the search (e.g., because $S_{servingcell} > S_{intrasearch}$ or $S_{servingcell} > S_{intersearch}$), the user may be notified of the same along with, optionally, a cause value.

The above concepts may be applicable in Active mode as well if an autonomous CSG search or a manual CSG search is triggered in Active mode, with the difference being that $S_{meas}$ replaces $S_{intrasearch}$ and $S_{intersearch}$.

If the highest ranked cell is a CSG cell which is not suitable due to not being part of the CSG white list of the WTRU, the WTRU shall treat the cell as "barred," as defined in section 5.3.1 of TS 36.304, except that the WTRU shall consider that cell in any cell selection state as defined in section 5.2.8 of TS 36.304.

If the highest ranked cell is a private CSG cell which is not suitable due to not being part of the CSG white list of the WTRU, the WTRU shall treat the cell as "barred," as defined in section 5.3.1 of TS 36.304, except that the WTRU shall consider that cell in any cell selection state as defined in section 5.2.8 of TS 36.304.

Mobility-Based Speed Determination

In LTE, a count of the number of cell reselections is made to determine the speed at which the WTRU is moving. The speed can be calculated by counting the number of cell reselections over a given period of time. But this calculation is not accurate with CSG cells. Because the CSG cells are smaller in size, counting the number of CSG reselections could indicate that the WTRU is moving faster than it actually is. Several alternatives can be used to address this issue.

(1) Whenever a WTRU is camped on or in connected mode on a CSG cell, it automatically sets its mobility state to "normal mobility."

(2) CSG cells are not included in counting the number of cell reselections in a certain time period (e.g., $T_{CRmax}$) for determining a medium or high-mobility state.

(3) The WTRU is given different criteria when it counts the CSG cells to determine its mobility state. For example, the WTRU might have to count two CSG cells for every macro cell it counts for its mobility criteria.

(4) The WTRU may use the number of CSG cell SIBs (e.g., a SIB from each passed or traversed CSG cell, reselected or not) acquired or detected as part of an algorithm for mobility detection over CSG cells, whether in the white list or not.

Even if the WTRU does not change its mobility state according to the mobility state detection criteria for CSG cells, it might still keep a track of the mobility changes when in a CSG cell and may retain its mobility state detection as it moves from CSG cells to macro cells. The WTRU may also retain its mobility state when it moves across different frequency layers.

Inter-Cell Interference Coordination

A different power control mechanism for CSG cells than for macro cells may be used. The HeNB may use WTRU measurements of neighboring CSG cells to increase or decrease the power of the CSG cell deployed by the HeNB and used by the WTRU. Different parameters for power control can be used for CSG cells as compared to macro cells.

The parameters, thresholds, and offsets proposed herein may be configured in the WTRU independently or collectively using at least one of the following methods.

(1) Broadcast signaling on the serving cell (macro or CSG; e.g., using SIB3).

(2) Broadcast signaling on the CSG cell that the WTRU wishes to reselect to.

(3) Dedicated signaling to the WTRU (e.g., RRC signaling or NAS signaling).

(4) As part of the CSG white list configuration in the WTRU.

(5) Pre-configured in the WTRU (and optionally stored in the USIM).

(6) A fixed value.

The parameters proposed above may be different for private CSG cells and public CSG cells. Some parameters may be broadcast in the macro cell as well as in the CSG cell. As an example, the WTRU may apply some of the parameters (received from the macro cell) as it is attempting to reselect and, upon detecting the SIBs of the CSG cell, start applying the parameters received from the CSG cell. For example, the CSG cell may broadcast some parameters necessary for a WTRU to reselect to it. This concept may apply to macro cells as well. Some of these parameters may include: $S_{CSGsearch}$, $S_{CSGsearchneigh}$, $Thresh_{CSG,high}$, $T_{CSGreselection}$, $Q_{offsetCSG}$, $Q_{hystCSG}$, and $Q_{hystCSGserving}$. By setting $Thresh_{CSG,high}$ to be a large value, a CSG cell may prevent reselection to itself. This may also be used for interference management.

Although the embodiments disclosed herein relate to an LTE system, the principles described may also apply (with reasonable modifications) to any radio access system (e.g., WCDMA, GERAN, etc.). Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for use in a wireless transmit/receive unit (WTRU), the method comprising:
receiving priority information for each of a plurality of communication frequencies;
storing the priority information at the WTRU;
applying the priority information to at least one Closed Subscriber Group (CSG) cell; and
reselecting to a CSG cell, of the at least one CSG cell, in one of the plurality of communication frequencies on a condition that the CSG cell is included in a white list of the WTRU, wherein the CSG cell included in the white list of the WTRU is assigned a higher priority for reselection than a non-CSG cell.

2. The method according to claim 1, wherein the applying includes selecting a highest priority communication frequency.

3. The method according to claim 1, wherein on a condition that a cell reselection is considered between the CSG cell and a non-CSG cell, the non-CSG cell is assumed to have a lower priority than the CSG cell.

4. A method for use in a wireless transmit/receive unit (WTRU), the method comprising:
detecting a cell;
determining whether the cell is a Closed Subscriber Group (CSG) cell;
reading an intra-frequency reselection indication associated with the cell; and
allowing intra-frequency cell reselection regardless of the value of the intra-frequency reselection indication on a condition that the cell is a CSG cell.

5. The method according to claim 4, further comprising:
on a condition that the cell is a CSG cell, reselecting to another cell on a same frequency as the cell regardless of the intra-frequency cell reselection indication.

6. A method for use in a wireless transmit/receive unit (WTRU), the method comprising:
receiving priority information for each of a plurality of communication frequencies, wherein the priority information includes a one bit indicator for each of the plurality of communication frequencies;
storing the priority information at the WTRU;
applying the priority information to at least one Closed Subscriber Group (CSG) cell; and
reselecting to a CSG cell, of the at least one CSG cell, in one of the plurality of communication frequencies on a condition that the CSG cell is included in a white list of the WTRU.

7. The method according to claim 6, wherein the one bit indicator indicates whether the CSG cell is a public CSG cell or a private CSG cell.

8. The method according to claim 7, wherein the reselecting is performed on a further condition that the one bit indicator indicates that the CSG cell is a private CSG cell.

9. A wireless transmit/receive unit (WTRU) comprising:
a receiver configured to receive priority information for each of a plurality of communication frequencies;
a memory configured to store the priority information; and
a processor configured to:
apply the priority information to at least one closed subscriber group (CSG) cell; and
reselect to a CSG cell, of the at least one CSG cell, in one of the plurality of communication frequencies on a condition that the CSG cell is included in a white list of the WTRU, wherein the CSG cell included in the white list of the WTRU is assigned a higher priority for reselection than a non-CSG cell.

10. The WTRU of claim 9, wherein the processor is further configured to apply the priority information by selecting a highest priority communication frequency.

11. The WTRU of claim 9, wherein on a condition that a cell reselection is considered between the CSG cell and a non-CSG cell, the non-CSG cell is assumed to have a lower priority than the CSG cell.

12. A wireless transmit/receive unit (WTRU) comprising:
a receiver configured to receive priority information for each of a plurality of communication frequencies, wherein the priority information includes a one bit indicator for each of the plurality of communication frequencies;
a memory configured to store the priority information; and
a processor configured to:
apply the priority information to at least one closed subscriber group (CSG) cell; and
reselect to a CSG cell, of the at least one CSG cell, in one of the plurality of communication frequencies on a condition that the CSG cell is included in a white list of the WTRU.

13. The WTRU of claim 12, wherein the one bit indicator indicates whether the CSG cell is a public CSG cell or a private CSG cell.

14. The WTRU of claim 13, wherein the processor is further configured to reselect to the CSG cell on a further condition that the one bit indicator indicates that the CSG cell is a private CSG cell.

15. A wireless transmit/receive unit (WTRU) comprising:
a processor, a transmitter, and a receiver configured to:
detect a cell;
determine whether the cell is a Closed Subscriber Group (CSG) cell;
read an intra-frequency reselection indication associated with the cell; and
allow intra-frequency cell reselection regardless of the value of the intra-frequency reselection indication on a condition that the cell is a CSG cell.

16. The WTRU of claim 15, wherein the processor, the transmitter, and the receiver are further configured to reselect to another cell on a same frequency as the cell regardless of the intra-frequency cell reselection indication on a condition that the cell is a CSG cell.

17. The method of claim 5, wherein the reselecting is performed on a further condition that at least one cell reselection criteria is satisfied.

18. The method of claim 4, further comprising:
on a condition that the cell is not a CSG cell, reselecting to another cell that is on a different frequency from the cell on a condition that the intra-frequency cell reselection indication indicates that intra-frequency cell reselection is disallowed.

19. The WTRU of claim 16, wherein the processor, the transmitter, and the receiver are further configured to reselect on a further condition that at least one cell reselection criteria is satisfied.

20. The WTRU of claim 15, wherein the processor, the transmitter, and the receiver are further configured to reselect to another cell that is on a different frequency from the cell on a condition that the intra-frequency cell reselection indication indicates that intra-frequency cell reselection is disallowed on a condition that the cell is not a CSG cell.

* * * * *